United States Patent [19]

Harlan

[11] 4,350,995
[45] Sep. 21, 1982

[54] SELF-LIMITING VIDEO SIGNAL PEAKING CIRCUIT

[75] Inventor: Wayne E. Harlan, Indianapolis, Ind.

[73] Assignee: RCA Corporation, New York, N.Y.

[21] Appl. No.: 255,982

[22] Filed: Apr. 20, 1981

[51] Int. Cl.³ .............................................. H04N 5/14
[52] U.S. Cl. ....................................... 358/37; 358/166
[58] Field of Search .................... 358/37, 38, 162, 166

[56] References Cited

U.S. PATENT DOCUMENTS

| 3,780,215 | 12/1973 | Shibata et al. | 178/5.4 R |
|---|---|---|---|
| 3,983,576 | 9/1976 | Shanely et al. | 358/38 |
| 4,080,627 | 3/1978 | Wheeler | 358/162 |
| 4,081,836 | 3/1978 | Skinner | 358/166 |

Primary Examiner—John C. Martin
Attorney, Agent, or Firm—Eugene M. Whitacre; William H. Meagher; Ronald H. Kurdyla

[57] ABSTRACT

A circuit for peaking video signals is disclosed. The circuit includes a differential amplifier which produces a peaking component at an output, and a signal delay line for determining the frequency at which maximum peaking occurs. The delay line input is coupled to a source of video signals to be peaked and to one input of the differential amplifier, and the delay line output is coupled to another input of the differential amplifier and to a signal combining point. A peaked video signal is produced by combining the peaking component from the differential amplifier with the delayed signal from the delay line. The operating parameters of the peaking circuit are established with respect to a normally expected range of video signal amplitude transitions so that the differential amplifier exhibits a linear response for transient or aperiodic transitions throughout the amplitude transition range. However, the differential amplifier exhibits a non-linear response for periodic transitions recurring at the maximum peaking frequency, and having a magnitude greater than half the maximum transition magnitude of the range.

7 Claims, 14 Drawing Figures

SELF-LIMITING VIDEO SIGNAL PEAKING CIRCUIT

This invention relates to an arrangement for improving the transient response of a video signal processing system to enhance the detail of an image reproduced from the video signal. In particular, the invention concerns a peaking signal generator arrangement which self-limits excessive peaking signals otherwise likely to impair or distort image detail resolution.

It is known that the response of video signal processing systems, such as found in a television receiver, may be subjectively improved by increasing the slope or "steepness" of video signal amplitude transitions. The response may also be improved by generating a signal "preshoot" just before an amplitude transition, and a signal "overshoot" just after the amplitude transition, so that black-to-white and white-to-black transitions are accentuated.

While it is desirable to impart preshoot and overshoot peaking components to video signals, care should be taken to avoid undesirable side effects due to excessively large peaking signals. For example, if a white-going peaking signal exceeds an acceptable limit, excessive beam current may be drawn by the image reproducing device such as the kinescope of a television receiver. In this event blooming (i.e., blurring or defocussing) of a portion of a displayed picture can occur.

Thus it may be desirable to compress or otherwise suppress peaking signals of a direction (e.g., the white direction) and magnitude likely to cause such distortion of image detail. One arrangement for accomplishing this result is described in U.S. Pat. No. 3,983,576—R. L. Shanley, II, et al. In that arrangement, a transversal equalizer network is employed to generate peaking signals comprising preshoots and overshoots. Also included is a network for suppressing peaking signals in one direction, the white direction. In accordance with the principles of the invention disclosed herein, it is recognized that certain types of video signals when subjected to peaking are more likely to produce intolerable distortion of picture detail. Specifically, it is recognized that although random transient or nonrepetitive (aperiodic) video signals after peaking can result in spot defocussing or blurring over a small image area, such a result can be tolerated in some systems since the visual effect may be difficult to perceive or tolerate by a viewer. This is typically not the case, however, in some systems when periodically repetitive signals (e.g., sinusoidal signals) are subjected to peaking. Excessively peaked periodic signals are very likely to produce significant distortion of picture detail over a greater image area, a situation which is much less tolerable for a viewer.

Accordingly, there is disclosed herein a peaking signal generator system wherein image distortion effects otherwise associated with peaked periodic video signals are reduced to an acceptable minimum, and wherein the peaking signal generator requires a minimum number of additional circuit components to accomplish this result.

STATEMENT OF INVENTION

A video signal peaking network according to the present invention exhibits a given amplitude versus frequency response including a frequency at which maximum signal peaking is produced, and comprises a source of video signals to be peaked, a signal delay network, a differential amplifier, and a combining network. The signals to be peaked include periodic and aperiodic amplitude transitions of varying magnitudes occupying a given range of transition magnitudes. The delay network is terminated to operate in a reflective mode and exhibits a signal delay for determining the maximum signal peaking frequency, and has an input coupled to the source of video signals and an output. The differential amplifier has a first input coupled to the delay network input and a second input coupled to the delay network output, for developing a peaking component at an output. A peaked video signal is provided at an output of the combining network by combining delayed signals from the delay network output with the peaking component from the differential amplifier output. The differential amplifier exhibits a linear response for aperiodic transitions of magnitudes throughout the range of transition magnitudes. The differential amplifier exhibits a non-linear response for periodic transitions recurring at the maximum peaking frequency and having a magnitude greater than half the maximum transition magnitude of the range, such that the differential amplifier develops an amplitude limited peaking component at the amplifier output.

In accordance with a feature of the invention, the differential amplifier comprises first and second transistors with inputs respectively coupled to the input and output of the delay network, and the combining network comprises a third transistor with an input coupled to the delay network output, and an output coupled to the output of the second transistor, such that peaked video signals are provided from the interconnected outputs of the second and third transistors.

In accordance with a further feature of the invention, the peaking network is included in a color television receiver employing a comb filter for separating the luminance and chrominance components of a color television signal. The luminance component is processed by the peaking network to develop a peaked luminance signal at the interconnected outputs of the second and third transistors. Luminance vertical detail signals derived from the chrominance output of the comb filter are coupled to the interconnected output electrodes of the second and third transistors for combining with the peaked luminance signals, to thereby produce a reconstituted luminance signal including vertical detail information and peaking components.

Figure 1:
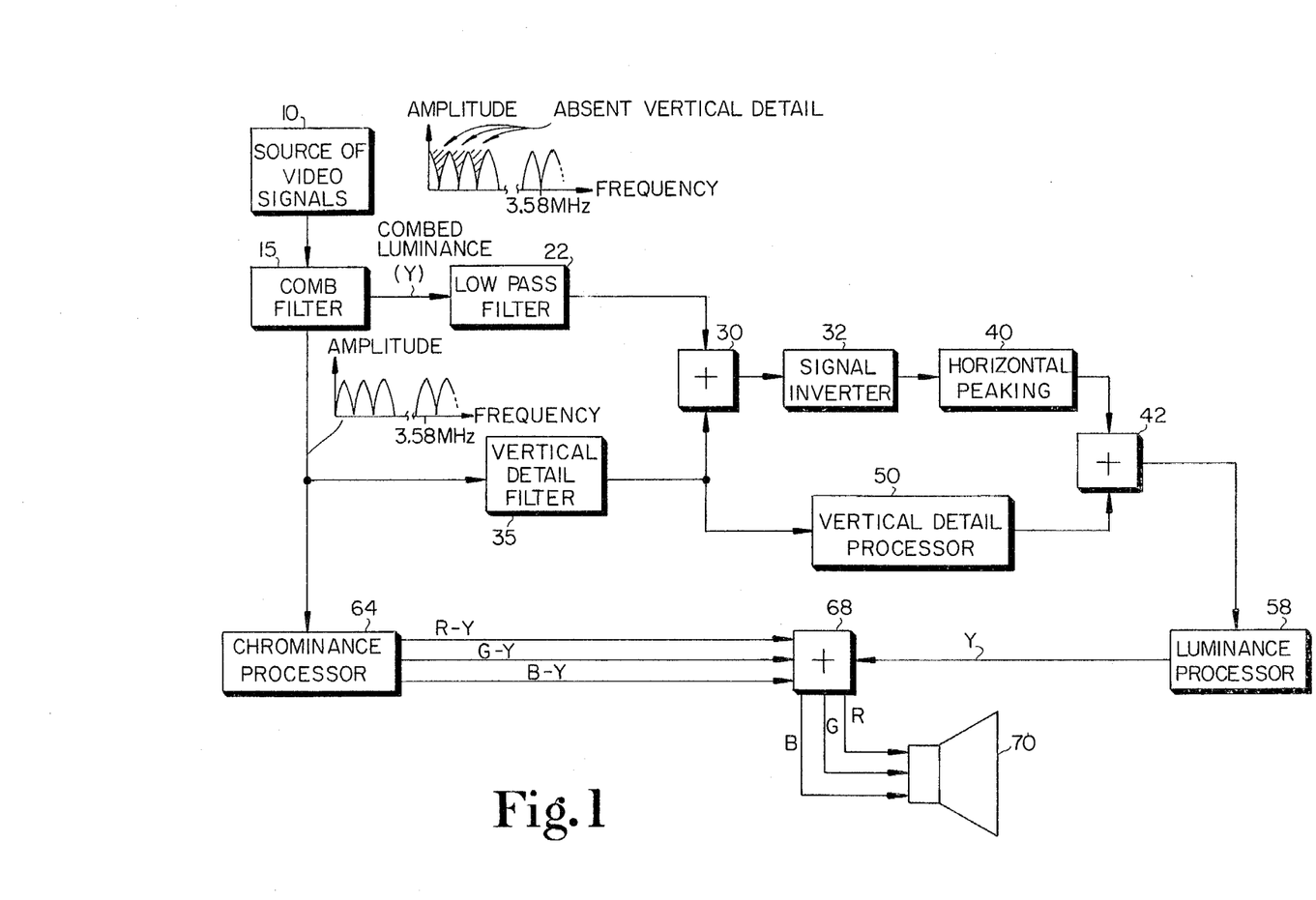
FIG. 1 shows a block diagram of a portion of a color television receiver including signal peaking apparatus according to the present invention.

In FIG. 1, a source of composite color video signals 10 including luminance and chrominance components supplies video signals to an input of a comb filter 15 of known configuration, such as a comb filter employing charge coupled devices (CCD's) as shown in U.S. Pat. No. 4,096,516. The luminance and chrominance components are arranged within the video signal frequency spectrum in frequency interleaved relation. The luminance component has a relatively wide bandwidth (extending from D.C. or zero frequency to about four megahertz). The upper frequency range of the luminance component is shared with the chrominance component, which comprises a subcarrier signal of 3.58 MHz. amplitude and phase modulated with color information. The amplitude versus frequency response of comb filter 15 with respect to luminance combing action exhibits a peak amplitude response at integral multiples of the horizontal line scanning frequency (approximately 15,734 Hz.) extending from D.C. or zero frequency, and an amplitude null at odd multiples of one-half the line scanning frequency, including the 3.58 MHz. chrominance subcarrier frequency. The amplitude versus frequency response of comb filter 15 with respect to chrominance combing action exhibits a peak amplitude response at odd multiples of one-half the line frequency including 3.58 MHz., and an amplitude null at integral multiples of the line frequency.

A "combed" luminance signal (Y) from a first output of comb filter 15 is coupled via a low pass filter 22 to an input of a signal combining network 30. Filter 22 is arranged to pass all luminance signals below a cut-off frequency of approximately 4 MHz., and serves to remove noise and clock frequency components of switching signals associated with the switching operation of comb filter 15 when of a CCD type comb filter.

A second output of comb filter 15 is applied to a chrominance signal processing unit 64 for generating R-Y, B-Y and G-Y color difference signals, and is also applied to an input of a low pass vertical detail filter 35. Unit 64 includes a suitable filter for passing only those signal frequencies from comb filter 15 which occupy the band of chrominance signal frequencies. Filter 35 exhibits a cut-off frequency of approximately 1.5 MHz., and selectively passes those signal frequencies present in the second signal output of comb filter 15 which lie below this cut-off frequency. Signal frequencies in this region represent vertical detail luminance information which is absent from the combed luminance signal and which must be restored to the luminance signal to avoid loss of vertical resolution in the luminance content of a displayed image. Such vertical detail restoration is accomplished by combining an appropriate linear amount of the vertical detail signal from filter 35 (which exhibits a linear amplitude transfer response), with the filtered combed luminance signal from filter 22, in combining network 30. The restored luminance signal from the output of combiner 30 is inverted by unit 32, subjected to horizontal detail processing by means of a horizontal peaking control network 40, and afterwards applied to an input of a signal combining network 42.

Vertical detail signals from filter 35 also are supplied to a non-linear vertical detail signal processing circuit 50, for imparting different amounts of signal gain to vertical detail signals within predetermined ranges of signal amplitude. Specifically, moderate amplitude vertical detail signals are peaked or enhanced, and large amplitude vertical detail signals are pared or attenuated. Processed signals from network 50 are supplied to another input of combiner 42, where they are summed with the signals from horizontal peaker 40. Additional information concerning the arrangement of horizontal processor 40 with vertical processor 50 is found in a copending, concurrently filed U.S. patent application Ser. No. 255,375, of W. A. Lagoni titled "Horizontal and Vertical Image Detail Processing of a Color Television Signal".

The output signal from combiner 42 corresponds to a reconstituted luminance component of the color television signal with the horizontal detail information processed as will be discussed, and with the vertical detail information thereof restored, enhanced (peaked) and pared (attenuated) as discussed in the aforementioned U.S. patent application of W. A. Lagoni. The reconstituted luminance component is afterwards applied to a luminance signal processing unit 58. An amplified luminance signal Y from unit 58 and the color difference signals from chrominance unit 64 are combined in a matrix 68 for providing R, B and G color image representative output signals. These signals are then suitably coupled to image intensity control electrodes of a color kinescope 70.

Figure 2:
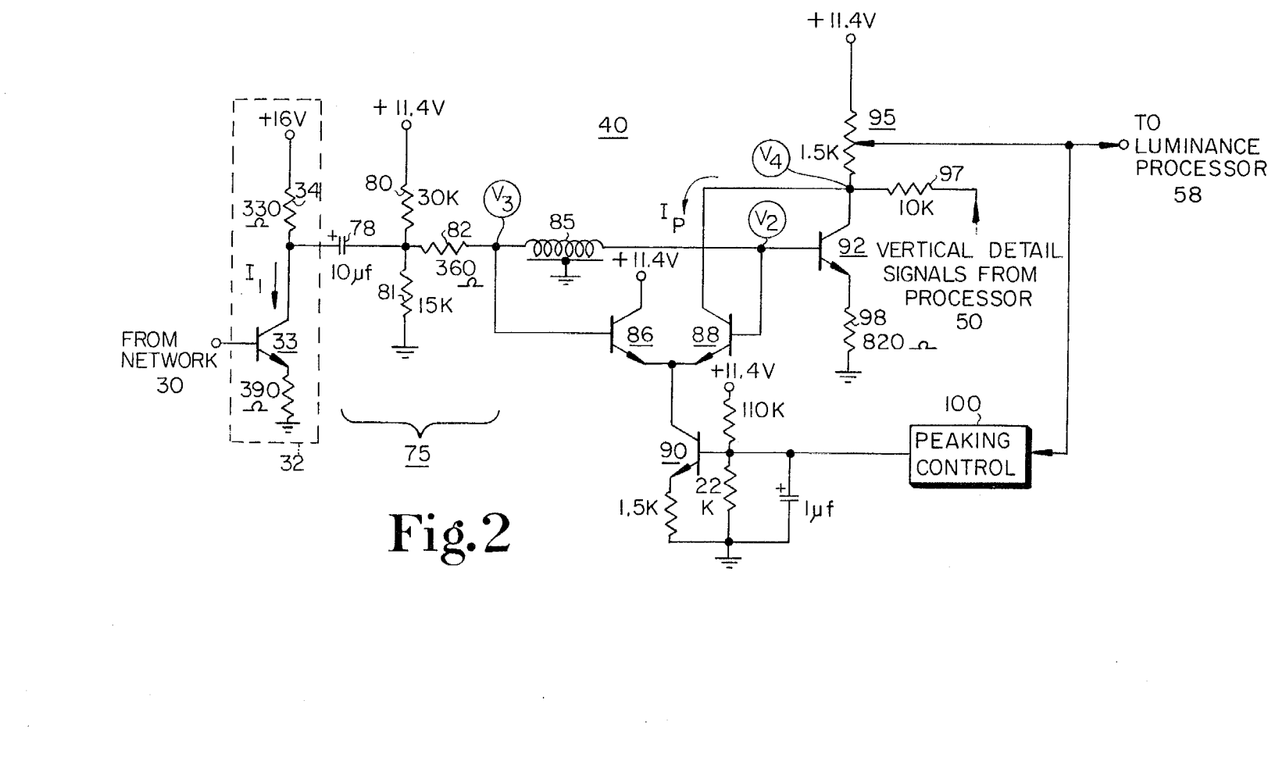
FIG. 2 shows a schematic circuit diagram of signal peaking apparatus according to the present invention.

FIG. 2 shows circuit details of horizontal peaking network 40 of FIG. 1.

In FIG. 2, restored combed luminance signals are applied from the output of network 30 to the input of horizontal peaking network 40 via signal inverter 32 comprising a transistor 33, and an input network 75 comprising a signal translating circuit including a capacitor 78 and resistors 80, 81 and 82. Peaking network 40 includes a delay line 85 coupled between the inputs of a differential amplifier comprising transistors 86 and 88. Operating currents for amplifier 86, 88 are provided from a DC current source including a transistor 90. Peaking network 40 also includes an output transistor 92 coupled to an output of delay line 85.

The luminance signal is applied via input network 75 to a first input of the differential amplifier at the base of transistor 86. A delayed luminance signal is applied via delay line 85 to a second input of the differential amplifier at the base of transistor 88. The output terminal of delay line 85 which is coupled to the high input impedance base electrodes of transistors 88 and 92 is substantially unterminated so that the delay line operates in a reflective mode, whereby a reflected and twice delayed luminance signal is developed at the base input of transistor 86. The delayed and twice delayed (reflected) signals cause the differential amplifier to develop preshoot and overshoot peaking signal components in the collector circuit of transistor 88. The preshoot and overshoot peaking components are combined with the delayed luminance signal in a common load impedance comprising a potentiometer 95 in the collector circuits of transistors 88 and 92 to develop a peaked luminance signal. A more specific description of the peaking circuit follows.

In this example delay line 85 exhibits a substantially linear phase response over the luminance signal bandwidth (zero Hz. to approximately 4.0 MHz.). Delay line 85 provides a signal delay on the order of 140 nanoseconds so that the amplitude-versus-frequency response of network 40 has a peak amplitude response at approximately 3.5 MHz. More specifically, the delay line network response resembles a sine-squared function wherein the signal peaking frequency range encompasses frequencies from 1.75 MHz. to 5.25 MHz. (the −6 db half amplitude points) with a maximum amplitude response at 3.5 MHz. Since the output of delay line 85 is terminated by the high input impedances of transistors 88 and 92, the delay line output is essentially unterminated relative to its characteristic impedance (680 ohms in this example) whereby the delay line operates in a reflective mode with a reflection coefficient of approximately unity. The input of delay line 85 is terminated in its characteristic impedance by means of resistors 80-82 of input network 75 together with collector load resistor 34 of inverter transistor 33. In addition to assisting to establish the input terminating impedance of the delay line, the input network including resistors 80–82 also translates the input signals so that signals with appropriate amplitude and DC level are applied to delay line 85 and differential amplifier 86, 88.

Figure 3:
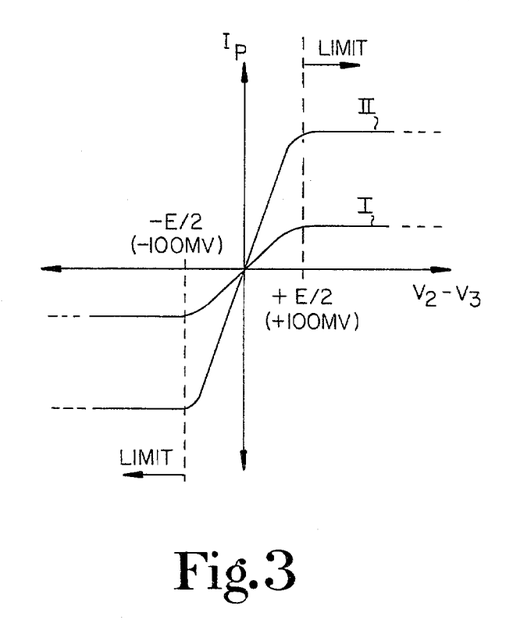
FIGS. 3–14 depict signal waveforms which are useful in understanding the operation of the signal peaking apparatus shown in FIGS. 1 and 2.

Differential amplifier 86, 88 is biased for symmetrical operation and exhibits a symmetrical input voltage ($V_2-V_3$) versus output current (Ip) response as shown in FIG. 3. Output current Ip corresponds to the collector current of transistor 88 associated with the preshoot and overshoot peaking component, as a function of the differential input voltage $V_2-V_3$ developed across delay line 85. Response (I) corresponds to a minimum peaking condition associated with one level of current available from current source transistor 90, and response (II) corresponds to a maximum peaking condition associated with a second, relatively greater level of current available from current source 90. The output response with respect to current Ip is substantially linear when the peak-to-peak differential input voltage $V_2-V_3$ is less than approximately 200 millivolts. The output current response becomes nonlinear, whereby the output current is "clipped" or "limited", when the peak-to-peak differential input voltage exceeds 200 millivolts. This 200 millivolt range comprises an upper limiting threshold of +100 millivolts (+E/2) and a lower limiting threshold of −100 millivolts (−E/2). The 200 millivolt differential input voltage level at which limiting of peaking component current Ip occurs is substantially the same for both response (I) and (II). However, the limiting point or "knee" is somewhat better defined or sharper for response (II) relative to response (I).

Figure 4:
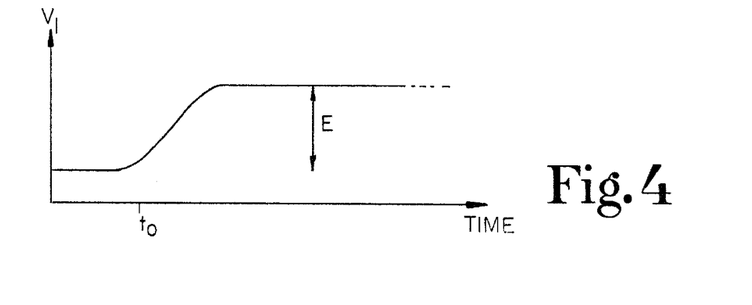
Figure 5:
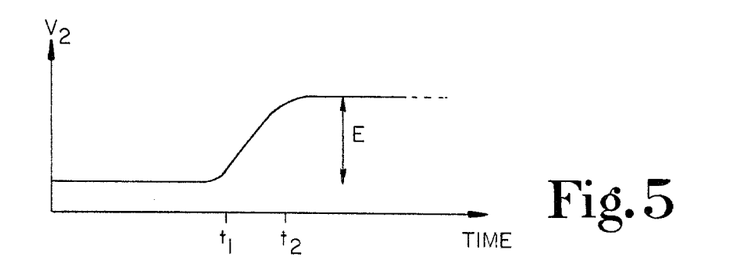
Figure 6:
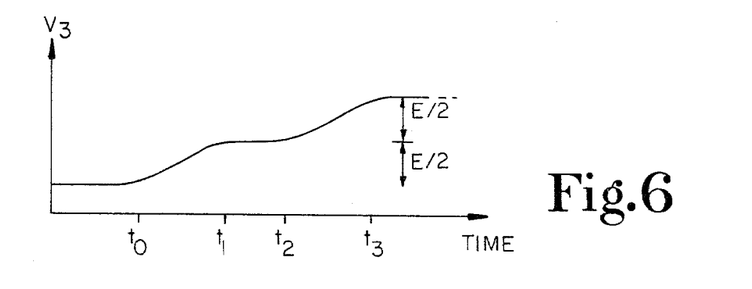
Figure 7:
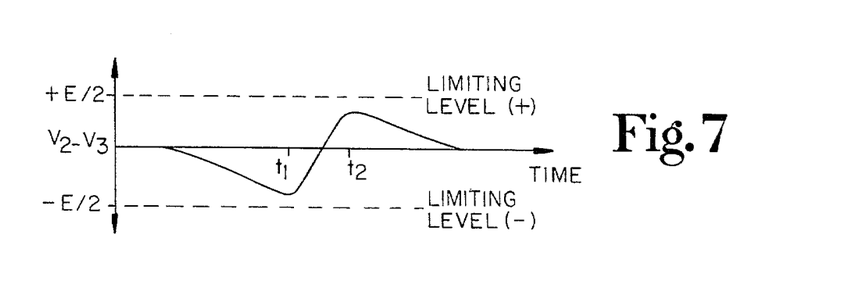
Figure 8:
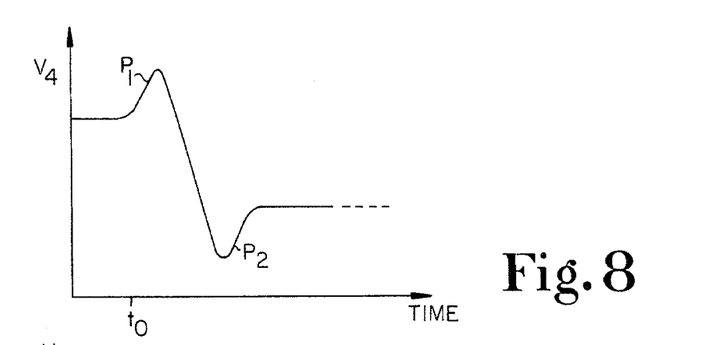

The following discussion of the operation of peaking circuit 40 is made with reference to FIGS. 2 and 4–8. An input luminance signal transient causes a corresponding current $I_1$ to be developed in the collector of transistor 33. This current corresponds to a signal $V_1$ as shown in FIG. 4, with an amplitude transition of magnitude E commencing at a time $t_o$ as shown in FIG. 4. Amplitude E corresponds to a normally expected maximum black level to white level amplitude transition range of input signals to be peaked. The input signal is applied to the input of delay line 85, propagates along the delay line, and appears in delayed from at the output of the delay line ($V_2$ in FIG. 5). Signal $V_2$ is then reflected back along the delay line towards the delay line input, where it combines with the incoming signal to develop signal $V_3$ (FIG. 6), and is afterwards absorbed by the delay line input terminating impedance which equals the delay line characteristic impedance (i.e., only one signal reflection is produced). The collector output current Ip of amplifier 86, 88 is linearly proportional to the differential input voltage $V_2-V_3$ (FIG. 7) of amplifier 86, 88 when the peak-to-peak level of the differential input voltage is less than the 200 millivolt peak-to-peak input limiting level (i.e., less than peak-to-peak amplitude E). Peaking current Ip from transistor 88 is summed in potentiometer 95 with collector current developed by transistor 92, which is proportional to signal $V_2$ (FIG. 5). Accordingly, an output signal $V_4$ (FIG. 8) is developed across potentiometer 95 at the joined collectors of transistors 88 and 92. Signal $V_4$ corresponds to a peaked luminance signal amplitude transition and includes a preshoot $P_1$ and an overshoot $P_2$. Output signals supplied from a wiper of potentiometer 95 to luminance processor 58 include horizontally peaked signals developed as discussed, as well as non-linearly processed (e.g., peaked and pared) vertical detail signals from processor 50 which are coupled via a resistor 97 to the combining point at the joined collectors of transistors 88 and 92.

The magnitudes of the preshoot and overshoot peaking components developed by circuit 40, and hence the steepness of output signal amplitude transitions, are determined by the magnitude of peaking current Ip. The magnitude of the peaking current can be controlled by controlling the level of conduction of current source transistor 90. In this embodiment such peaking control is accomplished by means of a peaking control network 100. Network 100 has an input coupled to the wiper of potentiometer 95 for sensing the amount of peaking present in video signals applied to luminance processor 58. Network 100 develops an output control voltage proportional to the amount of signal peaking detected, for automatically controlling the conduction of current source transistor 90 and thereby controlling the amount of signal peaking developed by network 40, so that the amount of peaking imparted to the output signal ($V_4$) is maintained within desired limits. It is noted that peaking control by means of controlling the amount of DC current supplied by transistor 90 is advantageous in that such control does not disturb the signal processing parameters of the main signal path including delay line 85. In particular, the phase of the signals subjected to peaking is not affected as the amount of peaking is varied by controlling transistor 90. Additional information concerning the structure and operation of the automatic peaking control system including network 100 is found in my copending, concurrently filed U.S. patent application Ser. No. 255,609, entitled "Automatic Video Signal Peaking Control".

It is also noted that potentiometer 95 combines collector currents from the interconnected high impedance collector electrodes of transistors 88 and 92, each of which represents a current source transistor. Specifically, transistor 88 acts as a high impedance current source with respect to peaking signal current Ip as developed in response to differential voltage $V_2-V_3$, and transistor 92 acts as a high impedance current source with respect to currents developed in response to unpeaked signal $V_2$ as applied to the base of transistors 92. With this arrangement, vertical detail signals from processor 50 can be added directly to the signal combining point at the interconnected collector electrodes of transistors 88 and 92, without disturbing the horizontally peaked signal which is developed at this point. Also, potentiometer 95 represents a convenient means of controlling the entire reconstituted luminance signal including peaked horizontal and vertical components. Thus, for example, potentiometer 95 can be utilized advantageously as a pre-set or viewer adjustable picture contrast control. The amount of unpeaked signal (i.e., $V_2$) that is to be combined with the peaking component can be adjusted independently by tailoring the value of emitter resistor 98.

It is noted that the described peaking network is arranged to minimize objectionable distortion effects which are likely to be produced when a periodically repetitive (e.g., sinusoidal) signal is processed by the peaking network. More specifically, the input signal level and operating parameters of the peaking network are mutually dimensioned so that processed periodic signals with an amplitude transition above a given level are limited or clipped, while processed transient or non-repetitive (aperiodic) amplitude transitions are not limited under normal circumstances.

FIGS. 9–14 show signal waveforms associated with the self-limiting operation of the peaking network with respect to sinusoidal input signals.

Figure 9:
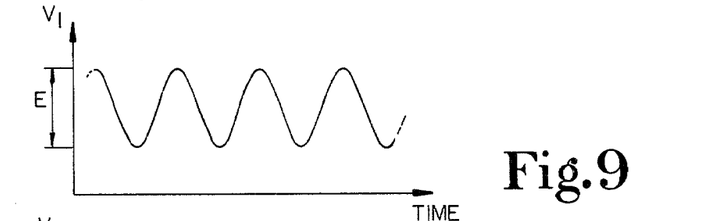

The input signal coupled via transistor 33 is shown in FIG. 9 as comprising a sinusoidal signal with a peak-to-peak amplitude E. In this example the frequency of the input signal corresponds to the 3.5 MHz. frequency (fp) at which maximum peaking is produced. This peaking frequency is determined by the 140 nanosecond signal delay (Δ) provided by delay line 85 according to the expression $$fp = (1)/(2\Delta).$$

Figure 10:
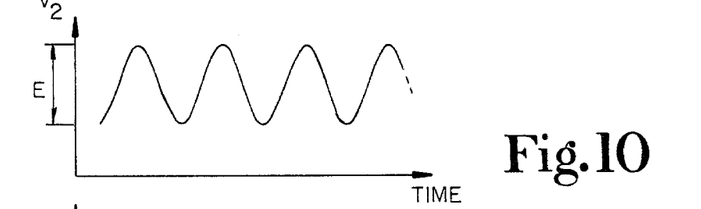
Figure 11:
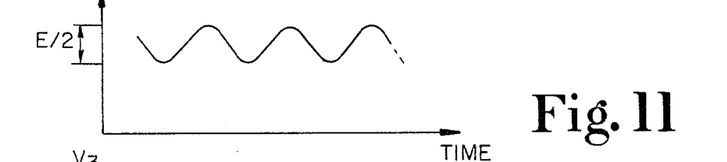
Figure 12:
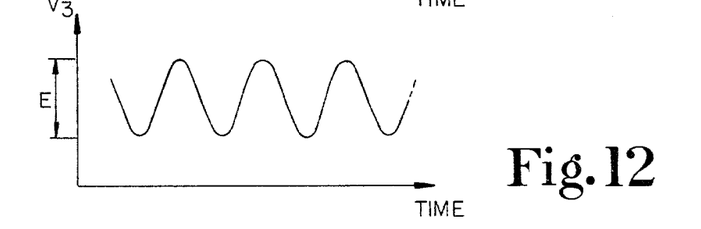

FIG. 10 shows the waveform of signal $V_2$ (corresponding to a delayed version of the input signal). FIG. 12 shows the waveform of signal $V_3$. This signal is produced by a half-amplitude incident component as shown in FIG. 11, and a reflected component (not shown) which is of the same form as the incident component but delayed one full cycle after being reflected back along the delay line. In this regard it is noted that the delay line imparts 180° phase shift to the delayed signal which travels from the delay line input to the delay line output at the base of transistor 92, and also imparts 180° phase shift to the delayed and reflected signal which travels from the delay line output to the delay line input.

Figure 13:
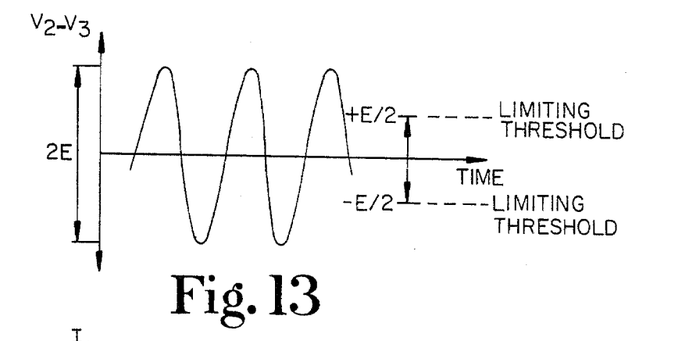
Figure 14:
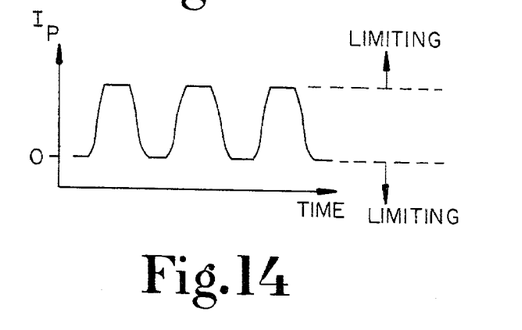

The difference between signals $V_2$ and $V_3$ (compare FIGS. 10 and 12) is sensed by differential amplifier 86, 88 in FIG. 2. These signals are mutually 180° out of phase (i.e., antiphased) and exhibit a maximum amplitude difference of E. A signal $V_2-V_3$ corresponding to this difference is provided at the input of differential amplifier 86, 88 as shown in FIG. 13. The output peaking current Ip, as induced by input voltage $V_2-V_3$ (FIG. 13), is amplitude limited or clipped as shown in FIG. 14. Specifically, the peaking current is limited when input voltage $V_2-V_3$ exhibits an amplitude greater than (more positive than) $+E/2$, and when input voltage $V_2-V_3$ exhibits an amplitude less than (more negative than) $-E/2$. Current limiting in the latter case is produced when transistor 88 is rendered non-conductive, whereby peaking current Ip is reduced to zero.

The peaking current Ip developed in response to signal $V_2-V_3$ produces a proportional but phase-inverted peaking voltage at the collector output of transistor 92. This peaking voltage is limited in amplitude when the peaking current is limited as discussed in connection with FIGS. 13 and 14. The peaking voltage is combined at the collector of transistor 92 with a phase-inverted version of signal $V_2$. The combined signals are similarly phased and correspond to a peaked version of the input signal.

The described limiting action particularly with respect to periodic signals prevents objectionable image distortion due to excessive peaking which would otherwise result.

In this example the differential amplifier operates non-linearly to produce amplitude limiting when the periodic signals recur at maximum peaking frequency fp (3.5 MHz.) and exhibit a peak-to-peak magnitude greater than E/2 (i.e., a magnitude greater than half the maximum amplitude transition magnitude E encompassed by the black-to-white signal transition range). Amplitude limiting will also occur at 1.75 MHz. (½ fp, the lower half amplitude frequency) and at 5.25 MHz. (3/2 fp, the upper half amplitude frequency), and at frequencies between these frequencies and fp. For example, signals of frequency fp will be at the limiting threshold when the peak-to-peak amplitude reaches E/2. Signals of half amplitude frequencies ½ fp and 3/2 fp will be at the limiting threshold when the peak-to-peak amplitude reaches magnitude E. Signals of frequencies between ½ fp and fp, and between fp and 3/2 fp, will reach the limiting threshold for peak-to-peak amplitudes between E/2 and E. In this embodiment, however, amplitude limited signals above about 4 MHz. will not be experienced since the input luminance signal bandwidth does not exceed 4 MHz.

What is claimed is:

1. A video signal peaking network exhibiting a given amplitude versus frequency response including a frequency at which maximum signal peaking is produced, comprising:

a source of video signals to be peaked including periodic and aperiodic amplitude transitions of varying magnitudes occupying a given range of transition magnitudes;

a signal delay network with an input coupled to said source of video signals and an output, said delay network being terminated to operate in a reflective mode and exhibiting a signal delay for determining said maximum signal peaking frequency;

a differential amplifier with a first input coupled to said delay network input and a second input coupled to said delay network output, for developing a peaking component at an output;

a combining network for combining delayed signals from said delay network output with said peaking component from said differential amplifier output, for providing a peaked video signal; and wherein said differential amplifier (1) exhibits a linear response for aperiodic transitions of magnitudes throughout said range, and (2) exhibits a non-linear response for periodic transitions recurring at said maximum peaking frequency and having a magnitude greater than half the maximum transition magnitude of said range, such that said differential amplifier develops an amplitude limited peaking component at said amplifier output in response to said periodic transitions of said maximum peaking frequency.

2. A network according to claim 1, wherein said signal delay provided by said delay network is such that delayed periodic signals developed at said second differential amplifier input are antiphased in relation to delayed and reflected periodic signals developed at said first differential amplifier input, when said periodic video signals exhibit said maximum peaking frequency.

3. A network according to claim 2, wherein said differential amplifier comprises first and second transistors with input electrodes, interconnected common electrodes, and output electrodes; said input of said first transistor being coupled to said input of said delay network, said input of said second transistor being coupled to said output of said delay network; and said combining network comprises a third transistor with an input electrode coupled to said output of said delay network, a common electrode, and an output electrode coupled to said output electrode of said second transistor and to a signal combining load impedance.

4. A network according to claim 3, wherein said input, output and common electrodes of said first, second and third transistors correspond to base, collector and emitter electrodes.

5. A network according to claim 3 included in a system for processing a video signal containing image representative luminance and chrominance components disposed within a frequency spectrum of said video signal in frequency interleaved relation, said system including a comb filter for providing at a first output a combed luminance signal with amplitude peaks at integral multiples of an image line scanning frequency and amplitude nulls at odd multiples of one-half said line frequency, and for providing at a second output a signal with amplitude peaks at odd multiples of one-half said line frequency and amplitude nulls at integral multiples of said line frequency, and wherein signals provided at said second output include signal frequencies representative of luminance vertical image detail information absent from said combed luminance signal at said first output;

means coupled to said second comb filter output for selectively passing said signal frequencies corresponding to vertical detail signal information, to the exclusion of signals occupying the band of chrominance signal frequencies; and means for processing said selectively passed vertical detail signals; and wherein said video signals to be peaked by said peaking network correspond to said luminance component; and said processed vertical detail signals are coupled to said output electrode of said third transistor for combining with peaked signals developed at said output of said third transistor.

6. A video signal peaking network exhibiting a given amplitude versus frequency response including a frequency at which maximum signal peaking is produced, comprising:

a source of video signals to be peaked including periodic and aperiodic amplitude transitions of varying magnitudes occupying a given range of transition magnitudes;

a signal delay network with an input coupled to said source of video signals and an output, said delay network being terminated to operate in a reflective mode and exhibiting a signal delay for determining said maximum signal peaking frequency;

a differential amplifier comprising first and second transistors, with input electrodes, interconnected common electrodes, and output electrodes; said input of said first transistor being coupled to said input of said delay network, and said input of said second transistor being coupled to said output of said delay network; and a signal combining network comprising a third transistor with an input electrode coupled to said output of said delay network, a common electrode, and an output electrode coupled to said output electrode of said second transistor and to a signal combining load impedance.

7. A network according to claim 6 included in a system for processing a video signal containing image representative luminance and chrominance components disposed within a frequency spectrum of said video signal in frequency interleaved relation, said system including a comb filter for providing at a first output a combed luminance signal with amplitude peaks at integral multiples of an image line scanning frequency and amplitude nulls at odd multiples of one-half said line frequency, and for providing at a second output a signal with amplitude peaks at odd multiples of one-half said line frequency and amplitude nulls at integral multiples of said line frequency, and wherein signals provided at said second output include signal frequencies representative of luminance vertical image detail information absent from said combed luminance signal at said first output;

means coupled to said second comb filter output for selectively passing said signal frequencies corresponding to vertical detail signal information, to the exclusion of signals occupying the band of chrominance signal frequencies; and means for processing said selectively passed vertical detail signals; and wherein said video signals to be peaked by said peaking network correspond to said luminance component; and said processed vertical detail signals are coupled to said output electrode of said third transistor for combining with peaked signals developed at said output of said third transistor.

* * * * *